United States Patent
Baumgartner et al.

(10) Patent No.: US 7,441,321 B2
(45) Date of Patent: Oct. 28, 2008

(54) METHOD OF MANUFACTURING ULTRASOUND TRANSDUCER DEVICE HAVING ACOUSTIC BACKING

(75) Inventors: Charles E. Baumgartner, Niskayuna, NY (US); David M. Mills, Niskayuna, NY (US); Robert S. Lewandowski, Amsterdam, NY (US); Lowell Scott Smith, Niskayuna, NY (US); Douglas G. Wildes, Ballston Lake, NY (US)

(73) Assignee: General Electric Company, Niskayuna, NY (US)

( * ) Notice: Subject to any disclaimer, the term of this patent is extended or adjusted under 35 U.S.C. 154(b) by 327 days.

(21) Appl. No.: 10/960,871

(22) Filed: Oct. 6, 2004

(65) Prior Publication Data

US 2005/0046311 A1 Mar. 3, 2005

Related U.S. Application Data (62) Division of application No. 10/248,022, filed on Dec. 11, 2002, now Pat. No. 6,831,394.

(51) Int. Cl.
*H04R 31/00* (2006.01)

(52) U.S. Cl. ............... 29/594; 29/593; 29/609.1; 216/62; 216/66; 310/309; 310/311; 310/334; 310/326; 600/443; 600/447; 600/459; 600/487

(58) Field of Classification Search ............... 29/593, 29/594, 609.1; 310/309, 311, 334, 326–328; 600/443, 447, 459, 487; 216/62, 66
See application file for complete search history.

(56) References Cited

U.S. PATENT DOCUMENTS

| 5,527,741 | A | 6/1996 | Cole et al. | |
|---|---|---|---|---|
| 5,982,709 | A | 11/1999 | Ladabaum et al. | |
| 6,239,482 | B1 | 5/2001 | Fillion et al. | |
| 6,242,282 | B1 | 6/2001 | Fillion et al. | |
| 6,246,158 | B1 | 6/2001 | Ladabaum | |
| 6,295,247 | B1 * | 9/2001 | Khuri-Yakub et al. | 367/140 |
| 6,328,697 | B1 | 12/2001 | Fraser | |
| 6,359,367 | B1 | 3/2002 | Sumanaweera et al. | |
| 6,430,109 | B1 | 8/2002 | Khuri-Yakub et al. | |
| 6,445,109 | B2 | 9/2002 | Percin et al. | |
| 6,537,220 | B1 * | 3/2003 | Friemel et al. | 600/447 |
| 6,551,248 | B2 * | 4/2003 | Miller | 600/459 |
| 6,632,178 | B1 * | 10/2003 | Fraser | 600/459 |

(Continued)

*Primary Examiner*—Paul D Kim
(74) *Attorney, Agent, or Firm*—Fletcher Yoder (57) ABSTRACT

An ultrasonic transducer device comprising: an ultrasonic transducer array micromachined on a substrate; flexible electrical connections connected to the transducer array; and a body of acoustically attenuative material that supports the substrate and the flexible electrical connections. The acoustic backing material may contain additional features, such as tabs or notches, for use in positioning the transducer on fixtures during manufacturing or positioning the transducer within a housing during final assembly. Tabs or other features that are used only during manufacturing may be subsequently removed from the device. The MUT device itself may also be thinned so as to provide flexibility as desired. The backing material is preferably matched in acoustic impedance to the silicon wafer so as to prevent reflection at the interface of any acoustic energy propagating rearward, i.e., in the direction away from the device front surface. The backing material may also possess a high thermal conductivity to assist in removal of heat from the device.

20 Claims, 4 Drawing Sheets

U.S. PATENT DOCUMENTS

| | | | |
|---|---|---|---|
| 6,659,954 B2 * | 12/2003 | Robinson | 600/459 |
| 6,676,602 B1 * | 1/2004 | Barnes et al. | 600/443 |
| 7,053,530 B2 * | 5/2006 | Baumgartner et al. | 310/334 |
| 2002/0048219 A1 | 4/2002 | Ladabaum et al. | |

* cited by examiner

METHOD OF MANUFACTURING ULTRASOUND TRANSDUCER DEVICE HAVING ACOUSTIC BACKING

RELATED PATENT APPLICATION

This application is a divisional of and claims priority from U.S. patent application Ser. No. 10/248,022 filed on Dec. 11, 2002 now U.S. Pat. No. 6,831,394.

BACKGROUND OF THE INVENTION

This invention generally relates to micromachined ultrasonic transducers. In particular, the invention relates to capacitive micromachined ultrasonic transducers (cMUTs). One specific application for cMUTs is in medical diagnostic ultrasound imaging systems.

Conventional ultrasound imaging transducers generate acoustic energy via a piezoelectric effect in which electrical energy is converted into acoustic energy using a poled piezoelectric ceramic material. The acoustic energy that is transmitted in the forward direction, which is in the direction of the patient being scanned, is coupled to the patient through one or more acoustic matching layers. However, the acoustic energy transmitted in the direction away from the patient being scanned is typically absorbed in and/or scattered in an acoustic backing material located on the backside of the transducer array. This prevents the acoustic energy from being reflected from structures or interfaces behind the transducer and back into the piezoelectric material, thereby reducing the quality of the acoustic image obtained from reflection within the patient. Numerous compositions for the acoustic backing material are known. For example, the acoustic backing material may consist of a composite of metal particles (e.g., tungsten) in an attenuating soft material such as rubber, epoxy or plastic. Other acoustic backing material compositions may also be used.

The ultrasonic transducers used for medical diagnostic imaging have broad bandwidth and high sensitivity to low-level ultrasonic signals, which characteristics enable the production of high-quality images. Piezoelectric materials that satisfy these criteria and have been conventionally used to make ultrasonic transducers include lead zirconate titanate (PZT) ceramic and polyvinylidene fluoride. However, PZT transducers require ceramic manufacturing processes that are different from the processing technologies used to manufacture other parts of an ultrasound system, such as semiconductor components. It is desirable that ultrasonic transducers be manufactured using the same processes used to fabricate the semiconductor components.

Recently semiconductor processes have been used to manufacture ultrasonic transducers of a type known as micromachined ultrasonic transducers (MUTs), which may be of the capacitive (cMUT) or piezoelectric (pMUT) variety. cMUTs are tiny diaphragm-like devices with electrodes that convert the sound vibration of a received ultrasound signal into a modulated capacitance. For transmission the capacitive charge is modulated to vibrate the diaphragm of the device and thereby transmit a sound wave.

One advantage of MUTs is that they can be made using semiconductor fabrication processes, such as microfabrication processes grouped under the heading "micromachining". As explained in U.S. Pat. No. 6,359,367:

Micromachining is the formation of microscopic structures using a combination or subset of (A) Patterning tools (generally lithography such as projection-aligners or wafer-steppers), and (B) Deposition tools such as PVD (physical vapor deposition), CVD (chemical vapor deposition), LPCVD (low-pressure chemical vapor deposition), PECVD (plasma chemical vapor deposition), and (C) Etching tools such as wet-chemical etching, plasma-etching, ion-milling, sputter-etching or laser-etching. Micromachining is typically performed on substrates or wafers made of silicon, glass, sapphire or ceramic. Such substrates or wafers are generally very flat and smooth and have lateral dimensions in inches. They are usually processed as groups in cassettes as they travel from process tool to process tool. Each substrate can advantageously (but not necessarily) incorporate numerous copies of the product. There are two generic types of micromachining . . . 1) Bulk micromachining wherein the wafer or substrate has large portions of its thickness sculptured, and 2) Surface micromachining wherein the sculpturing is generally limited to the surface, and particularly to thin deposited films on the surface. The micromachining definition used herein includes the use of conventional or known micromachinable materials including silicon, sapphire, glass materials of all types, polymers (such as polyimide), polysilicon, silicon nitride, silicon oxynitride, thin film metals such as aluminum alloys, copper alloys and tungsten, spin-on-glasses (SOGs), implantable or diffused dopants and grown films such as silicon oxides and nitrides.

The same definition of micromachining is adopted herein.

Acoustic energy generated using a capacitive micromachined ultrasonic transducer device does not rely on a piezoelectric material to generate ultrasonic energy. Rather, the basic structure of a cMUT is that of a conductive membrane or diaphragm suspended above a conductive electrode by a small gap. When a voltage is applied between the membrane and the electrode, Coulombic forces attract the membrane to the electrode. If the applied voltage varies in time, so too will the membrane position, generating acoustic energy that radiates from the face of the device as the membrane moves in position. While the acoustic energy is generated primarily in the forward, or patient, direction, some fraction of the acoustic energy will be propagated into the cMUT supporting structure. This structure is commonly a silicon wafer. An acoustic backing material is therefore needed to prevent reflection of this energy from the silicon/air interface at the back surface of the wafer back into the cMUT device. This is equally true for pMUT devices.

U.S. Patent Application Pub. No. US 2002/0048219 discloses a microfabricated acoustic transducer with suppressed substrate modes. This publication discloses the application of acoustic damping material on the backside of the transducer substrate.

A MUT device benefits from a backing material in more ways than simply acoustic performance. A MUT device manufactured on a silicon wafer is fragile and requires great care during the manufacturing process to not become damaged. For example, the electrical connection to the MUT device may be made by lamination of a flexible circuit. During this process, pressure is applied to the silicon wafer to bond electrical connections. Unevenly applied pressure can lead to fracture of the device. The thinned substrate onto which the MUT is built is very fragile and could benefit from a supportive structure.

There is a need for structures and methods for lending additional support to MUT (cMUT and pMUT) devices, while also enhancing the ability to damp undesirable acoustic waves that exit the rear face of the substrate of the MUT device.

BRIEF DESCRIPTION OF THE INVENTION

The present invention is directed to MUT devices having a body of acoustic backing material and to methods for manufacturing such devices. Various embodiments are disclosed in which an acoustic backing layer or a supporting membrane serve as vehicles for processing very thin substrates without inflicting damage. Other embodiments have acoustic backing material specifically designed for use with MUT arrays on silicon substrates. These features can be combined in one and the same embodiment.

One aspect of the invention is a method of manufacturing an ultrasound transducer comprising the following steps: attaching a substrate to a layer of acoustic backing material; thinning the substrate while it is attached to the layer of acoustic backing material; and micromachining an array of ultrasonic transducer cells on the substrate.

Another aspect of the invention is a method of manufacturing an ultrasound transducer comprising the following steps: micromachining an array of ultrasonic transducer cells on a substrate; attaching a front face of the array to a support membrane; thinning the substrate while supported by the support membrane; attaching a formed or conformal layer of backing material to the thinned substrate; and removing the supporting membrane.

A further aspect of the invention is a method of manufacturing an ultrasound transducer comprising the following steps: attaching a substrate having a first area to a layer of acoustic backing material having a second area greater than said first area, the substrate being placed so that respective portions of the layer of acoustic backing material extend beyond opposing side edges of the substrate; thinning the substrate while it is attached to the layer of acoustic backing material; micromachining an array of ultrasonic transducer cells on the substrate; and trimming off the respective portions of said layer of acoustic backing material subsequent to said micromachining step.

Other aspects of the invention are disclosed and claimed below.

DETAILED DESCRIPTION OF THE INVENTION

For the purpose of illustration, various embodiments of the invention will be described that belong to the class of capacitive micromachined ultrasonic transducers (cMUTs). However, it should be understood that the aspects of the invention disclosed herein are not limited to the structure or manufacture of cMUTs, but rather also apply to the structure or manufacture of pMUTs.

Figure 1:
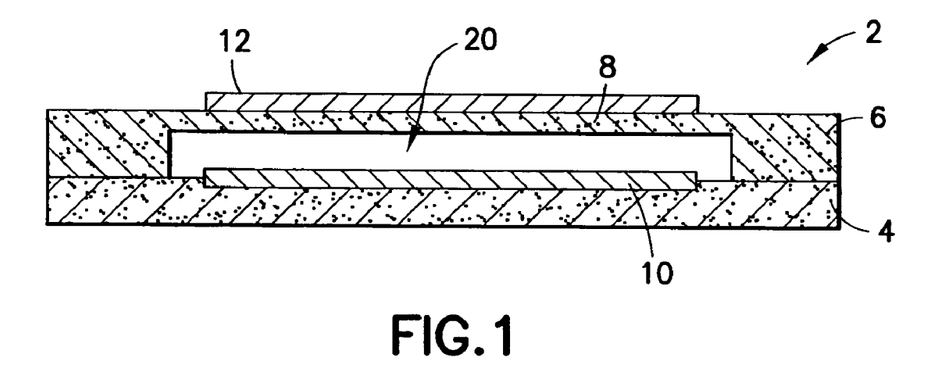
FIG. 1 is a drawing showing a cross-sectional view of a typical cMUT cell.

Referring to FIG. 1, a typical cMUT transducer cell 2 is shown in cross section. An array of such cMUT transducer cells is typically fabricated on a substrate 4, such as a silicon wafer. For each cMUT transducer cell, a thin membrane or diaphragm 8, which may be made of silicon nitride, is suspended above the substrate 4. The membrane 8 is supported on its periphery by an insulating support 6, which may be made of silicon oxide or silicon nitride. The cavity 20 between the membrane 8 and the substrate 4 may be air- or gas-filled or wholly or partially evacuated. A film or layer of conductive material, such as aluminum alloy or other suitable conductive material, forms an electrode 12 on the membrane 8, and another film or layer made of conductive material forms an electrode 10 on the substrate 4. Alternatively, the electrode 10 can be embedded in the substrate 4.

The two electrodes 10 and 12, separated by the cavity 20, form a capacitance. When an impinging acoustic signal causes the membrane 8 to vibrate, the variation in the capacitance can be detected using associated electronics (not shown in FIG. 1), thereby transducing the acoustic signal into an electrical signal. Conversely, an AC signal applied to one of the electrodes will modulate the charge on the electrode, which in turn causes a modulation in the capacitive force between the electrodes, the latter causing the diaphragm to move and thereby transmit an acoustic signal.

Due to the micron-size dimensions of a typical cMUT, numerous cMUT cells are typically fabricated in close proximity to form a single transducer element. The individual cells can have round, rectangular, hexagonal, or other peripheral shapes. Hexagonal shapes provide dense packing of the cMUT cells of a transducer element. The cMUT cells can have different dimensions so that the transducer element will have composite characteristics of the different cell sizes, giving the transducer a broadband characteristic.

In the embodiments disclosed herein, the cMUT devices comprise an array of cMUT cells built on a substrate and a layer of acoustically attenuative material, referred to herein as "acoustic backing". The acoustic backing layer has sufficient stiffness to provide structural support for a very thin substrate. Such an acoustic backing layer may be joined directly to the rear face of the substrate, e.g., using a thin layer of substantially acoustically transparent epoxy, or may be laminated to the substrate with intervening layers. Alternatively, the acoustic backing could be a castable or moldable composition that possesses sufficient acoustic impedance. In one embodiment, the intervening layer is made of acoustic impedance matching material having an acoustic impedance that lies between the acoustic impedance of the silicon substrate and the acoustic impedance of the acoustically attenuative material. In another embodiment, the intervening layer is a flexible printed circuit board ("flex circuit") having electrically conductive pads that connect to electrically conductive vias in the substrate.

The ultrasonic transducer device comprises: an ultrasonic transducer array micromachined on a substrate; flexible electrical connections connected to the transducer array; and a body of acoustically attenuative material that supports the substrate and the flexible electrical connections. In accordance with one embodiment of the invention, the acoustic backing material has an area greater than the area of the substrate and extends beyond the periphery of the substrate. The acoustic backing material provides additional support to the MUT device both during and following attachment of the electrical connections, thereby improving the manufacturability of the device. The acoustic backing material may contain additional features, such as tabs or notches, for use in positioning the transducer on fixtures during manufacturing or positioning the transducer within a housing during final assembly. Tabs or other features that are used only during manufacturing may be subsequently removed from the device. The MUT device itself may also be thinned so as to provide flexibility as desired. The backing material is preferably matched in acoustic impedance to the silicon wafer so as to prevent reflection at the interface of any acoustic energy propagating rearward, i.e., in the direction away from the device front surface. The backing material may also possess a high thermal conductivity to assist in removal of heat from the device.

Figure 2:
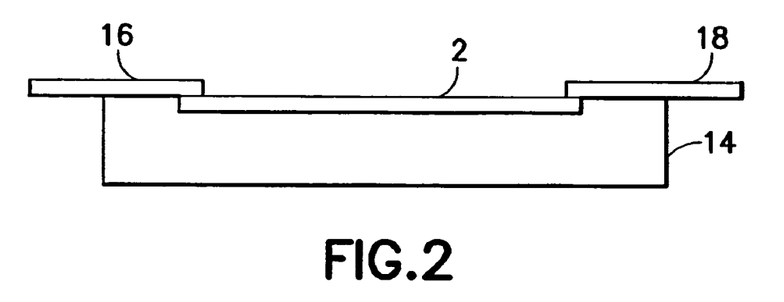
FIGS. 2 and 3 are drawings showing side and top views, respectively, of a cMUT device and associated electrical connections supported by a layer of acoustic backing material having temporary handling tabs in accordance with one embodiment of the invention.
Figure 3:
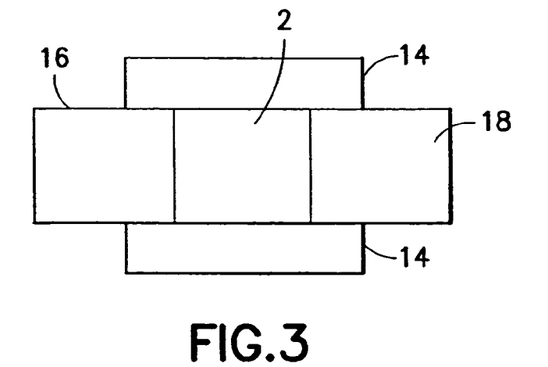

FIGS. 2 and 3 show side and top views respectively of a cMUT device 2 connected to appropriate electronics (not shown) via flexible electrical connections (e.g., flex circuits) 16 and 18. In the depicted embodiment, the cMUT device 2 is seated in a formed well in a body of acoustic backing material 14 (see FIG. 2). The top of the cMUT device lies generally flush with the top of those portions of the acoustic backing that extend beyond the footprint of the cMUT device, the distal edges of the flexible electrical connections 16 and 18 overlapping respective edges of the cMUT device, and adjoining portions of the flexible electrical connections 16 and 18 overlapping and joined to respective portions of the acoustic backing layer. As seen in FIG. 2, the acoustic backing layer 14 supports the cMUT device as well as the flexible electrical connections. The acoustic backing may be laminated directly to the silicon substrate or, as previously mentioned, an intervening acoustic impedance matching layer may be included in the laminated stack. an intervening acoustic impedance matching layer may be included in the laminated stack.

In the embodiment depicted in FIG. 2, the electrodes of each transducer cell (electrodes 10 and 12 in FIG. 1) are electrically connected to conductive pads formed (e.g., by printing) on those portions of the top surface of the cMUT device that are overlapped by the flexible electrical connections 16 and 18. Techniques for electrically connecting conductors in different strata of an integrated semiconductor structure are well known and will not be described in detail herein. Electrical connection between the flex circuits 16 and 18 and the conductive pads (not shown) on the cMUT device 2 can be made in several ways. The preferred manner uses anisotropically conductive films that are laminated between the flex circuit and the cMUT device. Alternatively, the electrical connection can be made using wire bonding, solder bumps, an epoxy bond sufficiently thin to allow for electrical contact via asperities on the surface of the cMUT device, anisotropically conductive film, or other common methods for making electrical contact to the cMUT device.

These combined components shown in FIG. 2 form a fragile union that, in the absence of the acoustic backing material 14, would be subject to damage during subsequent handling, especially in cases where the substrate is made very thin. As seen in FIG. 2, the acoustic backing material 14 extends beyond the area of the active cMUT device 2 in first and second directions, which are mutually opposite, to provide support for the electrical connection flex circuitry 16 and 18 and associated electronics. In this example, the area of the active cMUT device is generally rectangular. As best seen in FIG. 3, the acoustic backing also extends laterally beyond the area of the active cMUT device 2 in third and fourth directions, which are mutually opposite and which are orthogonal to the first and second directions, thus forming temporary handling tabs on opposing sides of the assembly.

Figure 4:
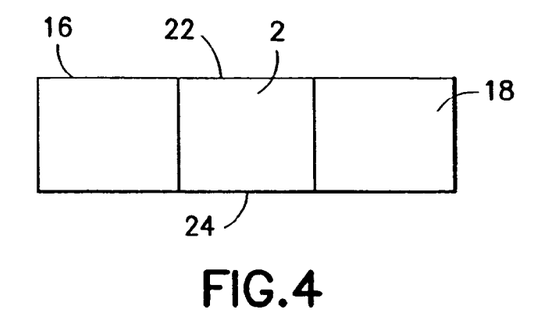
FIG. 4 is a drawing showing a top view of the cMUT device depicted in FIG. 1, but after the handling tabs have been removed.

In the foregoing example, the backing material 14 is applied to the cMUT device 2 prior to attachment of the electrical connections 16 and 18. The tabs (acoustic backing material 14 seen in FIG. 3) extend beyond the final device dimensions to provide additional handling support for improved manufacturing. These tabs can be subsequently removed as the device is cut to final size. FIG. 4 shows a top view of the final device after the backing material has been trimmed to final dimensions at the sides 22 and 24 of the array. Electronic components may be located along the sides 22 and 24 of the array perpendicular to the array face.

In accordance with one embodiment of the invention, the acoustic backing material has a composition that is acoustically matched to the cMUT substrate, to prevent reflection of the acoustic energy back into the device. In the case where the substrate 4 is made of silicon, one example of a suitable backing material comprises a mixture of 96.3% (by mass) tungsten (of which 85% was 10 micron and 15% was 1 micron particle size) and 3.67% polyvinyl chloride (PVC) powders. The powders were mixed in a rolling mixer for 2 hours. A portion of the powder was poured into a die suitable for hot pressing and the plungers were covered with Kapton® polyimide tape to prevent adhesion to the finished material. The temperature of the die was raised to 200° C. And then the pressure on the powder was raised to 19,000 psi. The die was then cooled to room temperature while maintaining the pressure.

Once removed from the die, the backing material was sliced into different thicknesses and the acoustic properties were measured. The acoustic impedance of this composite material was 19.4 Mrayls. This is an excellent match for the acoustic impedance in a cMUT silicon substrate, which is 19.8 Mrayls. The backing material also possesses an acoustic attenuation of −4.9 dB/mm at 5 MHz. This backing was bonded to the back of a cMUT device using a low-viscosity epoxy (Epo-Tek 301 commercially available from Epoxy Technology, Inc., Billerica, Mass.) After cleaning and application of an adhesion promoter to both surfaces. A thin bond line (less than one-twentieth of a wavelength in the epoxy and at the frequency of interest) is required to avoid an acoustic reflection from this interface. Bonding of the acoustic backing material to the cMUT device in this manner provides support for the otherwise fragile device, in addition to preventing acoustic reflection from a cMUT silicon substrate/air interface.

Figure 5:
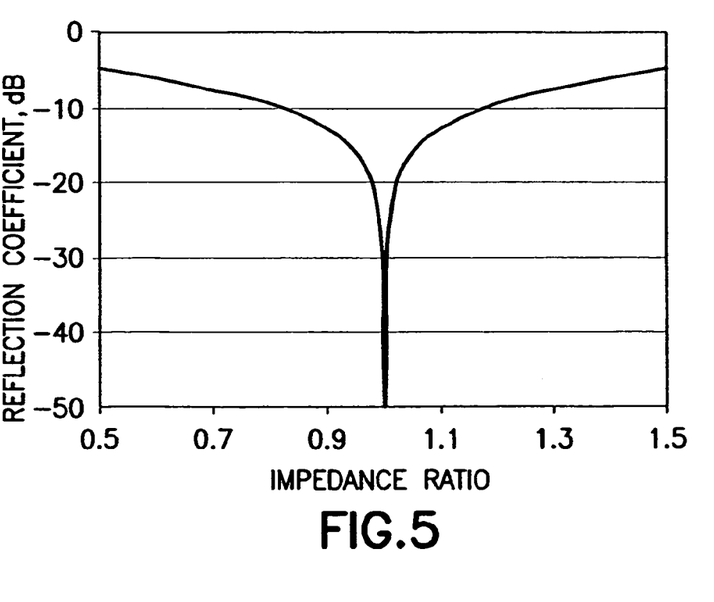
FIG. 5 is a graph showing the acoustic reflection coefficient as a function of the acoustic impedance ratio between the transducer and the backing.

The effectiveness of the backing depends to a great extent on the acoustic impedance and absorption of the backing material. A closely matched impedance greatly improves the transfer of energy from the transducer to the backing, while a high absorption ensures that sound in the backing will not return to the transducer at some later and hence undesirable time. FIG. 5 is a graph showing the acoustic reflection coefficient as a function of the impedance ratio between the transducer and the backing.

Figure 6:
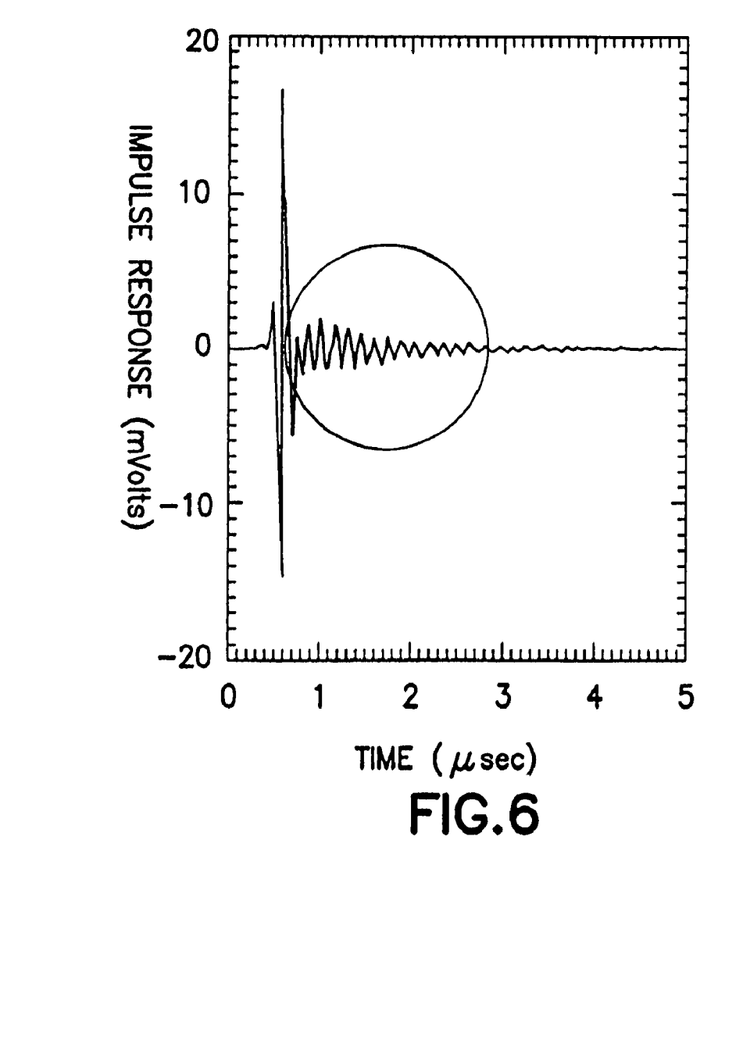
FIGS. 6 and 7 are graphs respectively showing the impulse response and the frequency spectrum for a cMUT array before the addition of acoustic backing.
Figure 7:
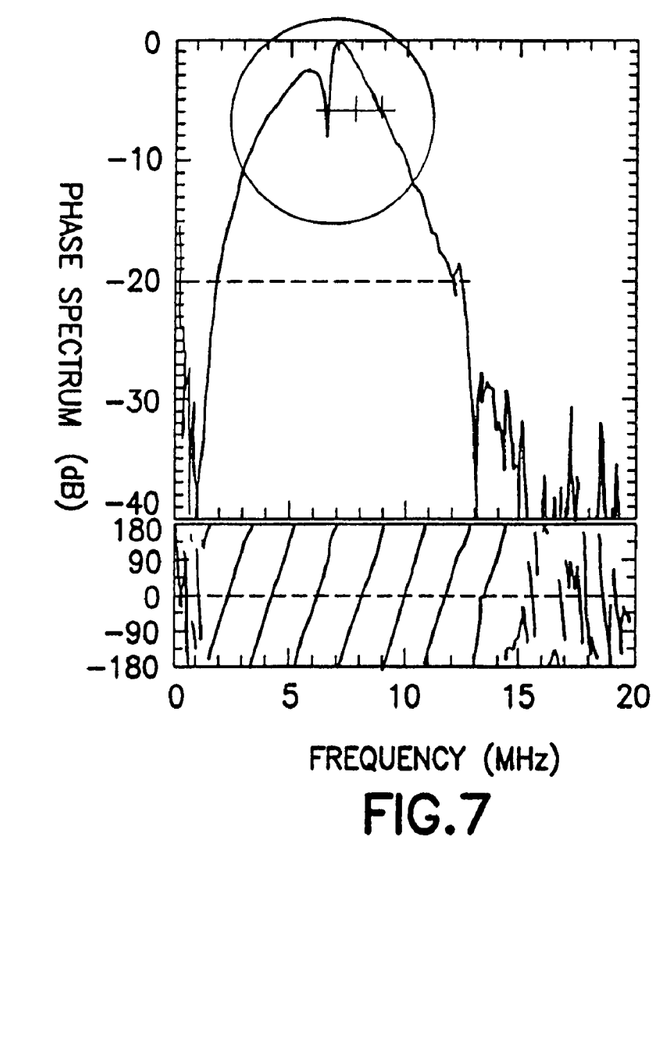
Figure 8:
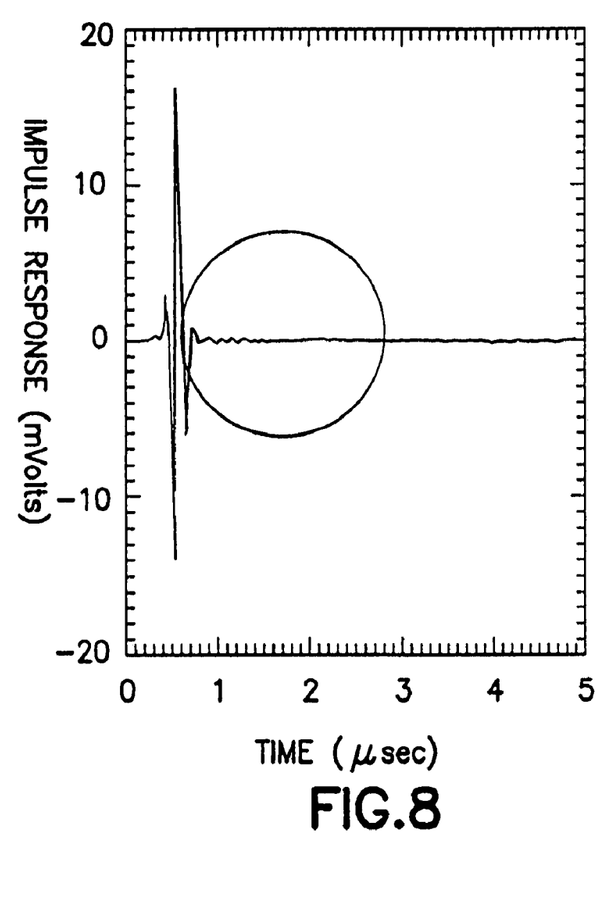
FIGS. 8 and 9 are graphs respectively showing the impulse response and the frequency spectrum for the same lensed cMUT array after the addition of acoustic backing.
Figure 9:
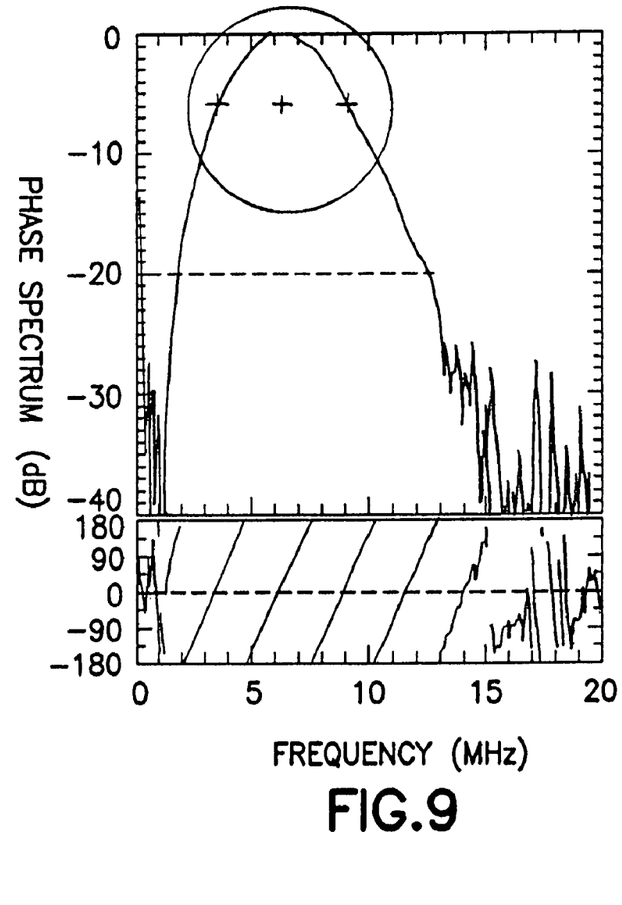

Another set of backing material was fabricated in a 1.75-inch-diameter round die (previously a 1.162-inch-diam. die was used). The same composition and temperature were used, but the pressure was only raised to 10,000 psi. Results from this process were slightly different: the acoustic impedance Z=20.6±0.3 MRayls and attenuation A=−5.96±0.03 dB at 5 MHz (density: rho=12.17±0.08 g/cm$^3$ and longitudinal velocity: V=1.70±0.01 m/sec). FIGS. 6 and 7 show the impulse response and frequency spectrum respectively for a lensed cMUT array before the acoustic backing was laminated to the array. The circles in FIGS. 6 and 7 respectively show ringing in the pulse and a notch in the frequency spectrum. FIGS. 8 and 9 show the impulse response and frequency spectrum respectively for a cMUT array after the acoustic backing was laminated to the array. The circles in FIGS. 8 and 9 respectively show the absence of ringing and the absence of a notch in the frequency spectrum.

The person skilled in the art will recognize that the composition of the acoustic backing material can be varied from the example given above, However, the acoustic impedance of the resulting backing material should be matched to that of silicon, i.e., approximately 19.8 MRayls±5%. Factors that affect this are not only the ratio of tungsten to PVC, but also the respective amounts of 1-micron tungsten versus 10-micron tungsten, the pressure at which the material is formed, the temperature and the length of time the material is pressed. The approximate composition range that would be suitable for backing cMUTs is 96.0% tungsten+4.0% PVC to 96.65% tungsten to 3.35% PVC (assuming a 3% swing in density yields roughly a 5% change in acoustic impedance, of which velocity changes by 2%).

In accordance with a further embodiment of the invention, a backing material that is acoustically matched to the cMUT substrate may be designed to possess high thermal conductivity. This can be accomplished by changing the composition of the backing material to include particles of one or more highly thermally conductive fillers dispersed within the backing material matrix. Examples of highly thermally conductive fillers include, but are not limited to, W, BN, AlN, $Al_2O_3$, and diamond. The backing material matrix can be a PVC, an epoxy, or other suitable matrix material to support the filler. The remaining composition of the backing material may also be modified in order to maintain the required properties in acoustic impedance and acoustic attenuation. A backing material of this type will offer improved performance in terms of removing heat generated by the cMUT and associated electronics away from the device for dissipation elsewhere. Removal of heat from the device is important in maintaining device performance and due to FDA-enforced thermal limits placed on the front face of medical ultrasound imaging devices.

A further benefit of this invention is for a manufacturing support for a very thin cMUT device. Some applications may benefit from a flexible cMUT device that can be bent to conform to a shape. Manufacture of such a device using present technology would require the silicon wafer be made thinner than is common in the industry. In this case, an appropriate backing material is useful both for subsequent handling and also potentially during manufacture of the cMUT device itself. For example, a silicon wafer could be attached to an acoustic backing material and then thinned to the appropriate final dimension. The wafer can be thinned using any of several methods such as etching or mechanical polishing. The acoustic backing material, in addition to acoustic performance, will also possess sufficient flexibility to allow for bending of the final device plus backing material package. In this example, the backing material is applied to the silicon wafer prior to building of the cMUT device, in which case the backing material can be considered as part of the total device package.

Conversely, a similar final device may be constructed as follows. The front face of the cMUT device may be bonded to a support membrane and then the back surface of the silicon can be thinned to a degree sufficient to impart flexibility to the device. A formed or conformal acoustic backing material is then attached to the thin cMUT device and the front support membrane is removed to yield the final device.

The embodiment depicted in FIG. 2 involves placing a flexible interconnect circuit on top of the cMUT array. Another possible means of interconnecting the array is to bring the connections through the backing via wires or traces embedded in the backing material. These connections can then be brought to the surface of the cMUT device by means of through-wafer vias or wrap-around connections. In accordance with a further variation, a flex circuit can be disposed underneath the silicon substrate, and then use through-wafer vias or wrap-around connections to bring the signals to the top of the cMUT device.

While the invention has been described with reference to preferred embodiments, it will be understood by those skilled in the art that various changes may be made and equivalents may be substituted for elements thereof without departing from the scope of the invention. In addition, many modifications may be made to adapt a particular situation to the teachings of the invention without departing from the essential scope thereof. Therefore it is intended that the invention not be limited to the particular embodiment disclosed as the best mode contemplated for carrying out this invention, but that the invention will include all embodiments falling within the scope of the appended claims.

As used in the claims, the term "ultrasonic transducer" encompasses capacitive and piezoelectric ultrasonic transducers.

The invention claimed is:

1. A method of maufacturing an ultrasound transducer comprising the following steps:
   attaching a substrate having a first area to a layer of acoustic backing material having a second area greater than the first area, the substrate being placed so that respective portions of the layer of acoustic backing material extend beyond opposing side edges of the substrate;
   thinning the substrate while the substrate is attached to the layer of acoustic backing material;
   micromachining an away of ultrasonic transducer cells on the substrate with the layer of acoustic backing material; and
   trimming off the respective portions of the layer of acoustic backing material subsequent to the micromachining step.

2. The method as recited in claim 1, wherein thinning comprises thinning the array and the substrate by etching, polishing or grinding.

3. The method as recited in claim 1, wherein the acoustic backing material attenuates acoustic waves produced by the array of ultrasonic transducer cells that pass through the substrate and into the acoustic backing material.

4. The method as recited in claim 3, wherein the acoustic backing material is matched in acoustic impedance to the material of the substrate to prevent reflection at an inerface of the substrate and the layer of acoustic backing material.

5. The method as recited in claim 1, wherein attaching comprises attaching the layer of acoustic backing material directly to the substrate using a thin layer of substantially acoustically transparent epoxy.

6. The method as recited in claim 1, wherein attaching comprises laminating the layer of acoustic backing material to the substrate with at least one intervening layer.

7. The method as recited in claim 6, wherein the at least one intervening layer comprises a flexible printed circuit board comprising conductive traces printed on a flexible substrate made of dielectric material.

8. The method as recited in claim 6, wherein the at least one intervening layer comprises a layer of acoustic impedance matching material, the acoustic impedance of said acoustic impedance matching material has a value that lies between the acoustic impedances of the material of the substrate and the acoustic backing material.

9. The method as recited in claim 1, wherein the substrate comprises silicon.

10. The method as recited in claim 1, wherein the array of ultrasonic transducer cells comprises a multiplicity of cMUT cells.

11. The method as recited in claim 1, wherein the array of ultrasonic transducer cells comprises a multiplicity of pMUT cells.

12. The method as recited in claim 1, wherein the respective portions of the layer of acoustic backing material comprise a pair of tabs that extend beyond the opposing side edges of the substrate.

13. The method as recited in claim 1, wherein the acoustic backing material comprises at least one of tungsten particles, or particles of highly thermally conductive filler material, or a combination thereof, dispersed in a matrix material.

14. A method of manufacturing an ultrasound transducer comprising the following steps:
   attaching a substrate to a layer of acoustic backing material, said acoustic backing material comprising tungsten particles dispersed in a matrix material;
   thinning said substrate while the substrate is attached to said layer of acoustic backing material; and
   micromachining an away of ultrasonic transducer cells on said substrate with the layer of acoustic backing material.

15. The method as recited in claim 14, wherein the mass percent of tungsten lies in the range of 96.0% to 96.65%, with the remainder being said matrix material, and wherein a first fraction of said tungsten particles have a particle size on the order of 1 micron and a second fraction of said tungsten particles have a particle size on the order of 10 microns.

16. The method as recited in claim 15, wherein said first and second fractions being approximately 15% and 85% respectively by mass of the total tungsten in said acoustic backing material.

17. The method as recited in claim 14, wherein said matrix material is polyvinyl chloride or a epoxy.

18. The method as recited in claim 14, wherein said acoustic backing material further comprises particles of highly thermally conductive filler material dispersed in said matrix material.

19. The method as recited in claim 18, wherein said highly thermally conductive filler material comprises at least one of W, BN, AlN, $Al_2O_3$, diamond or a combination thereof.

20. A method of manufacturing an ultrasound transducer comprising the following steps:
   attaching a substrate having a first area to a layer of acoustic backing material having a second area greater than said first area, the substrate being placed so that respective portions of the layer of acoustic backing material extend beyond opposing side edges of the substrate;
   micromachining an array of ultrasonic transducers after a process of attaching the array of ultrasonic transducers to the layer of acoustic backing material; and
   trimming off the respective portions of the layer of acoustic backing material subsequent to the micromachining step.

* * * * *

UNITED STATES PATENT AND TRADEMARK OFFICE
CERTIFICATE OF CORRECTION

PATENT NO. : 7,441,321 B2
APPLICATION NO. : 10/960871
DATED : October 28, 2008
INVENTOR(S) : Baumgartner et al.

It is certified that error appears in the above-identified patent and that said Letters Patent is hereby corrected as shown below:

In Column 5, Lines 37-39, after "the laminated stack." delete "an intervening acoustic impedance matching layer may be included in the laminated stack.".

In Column 8, Line 31, in Claim 1, delete "maufacturing" and insert -- manufacturing --, therefor.

In Column 8, Line 40, in Claim 1, delete "away" and insert -- array --, therefor.

In Column 8, Line 55, in Claim 4, delete "inerface" and insert -- interface --, therefor.

In Column 9, Line 31, in Claim 14, delete "away" and insert -- array --, therefor.

Signed and Sealed this

Thirtieth Day of November, 2010

David J. Kappos
*Director of the United States Patent and Trademark Office*